(12) United States Patent
Cox et al.

(10) Patent No.: US 9,334,047 B2
(45) Date of Patent: May 10, 2016

(54) METHOD AND SYSTEM FOR THE POWERED SELF PUSH BACK OF AN AIRCRAFT

(75) Inventors: Isaiah W. Cox, Baltimore, MD (US); Neal Gilleran, Long Beach, CA (US); Joseph Goldman, Pikesville, MD (US)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 14/004,158

(22) PCT Filed: Feb. 8, 2012

(86) PCT No.: PCT/US2012/024364
§ 371 (c)(1),
(2), (4) Date: Dec. 17, 2014

(87) PCT Pub. No.: WO2012/109380
PCT Pub. Date: Aug. 16, 2012

(65) Prior Publication Data
US 2015/0203193 A1 Jul. 23, 2015

Related U.S. Application Data

(60) Provisional application No. 61/440,652, filed on Feb. 8, 2011.

(51) Int. Cl.
*B64C 25/50* (2006.01)
*B64C 25/40* (2006.01)
(Continued)

(52) U.S. Cl.
CPC ............... *B64C 25/405* (2013.01); *B64C 25/34* (2013.01); *B64D 27/00* (2013.01); *B64F 2700/6238* (2013.01); *Y02T 50/823* (2013.01)

(58) Field of Classification Search
CPC .... B64C 25/34; B64C 25/405; Y02T 50/823; B64F 2700/6238; B64D 27/00
USPC ................ 701/2, 3, 120, 121; 244/50, 100 R, 244/103 R, 229
See application file for complete search history.

(56) References Cited

U.S. PATENT DOCUMENTS 5,480,274 A   1/1996  Franken et al.
6,305,484 B1  10/2001 Leblanc
(Continued)

OTHER PUBLICATIONS

Federal Aviation Administration (FAA), "4-3-25 Hand Signals", Aeronautical Information Manual (AIM), 2005, pp. AIM 4-37-AIM 4-38.

*Primary Examiner* — Russell Frejd

(57) ABSTRACT

A powered self push back method and system for an aircraft are provided to move an aircraft on the ground safely during push back without assistance from an external tug vehicle or the aircraft main engines. The method employs constant cooperative communication and signals between the pilot and the ground crew during the push back process to ensure that push back of the aircraft is safe, efficient, and reduces aircraft turnaround time. The powered self push back system used in conjunction with this method includes at least one powered self-propelled aircraft drive wheel powered by a wheel drive assembly that can be activated by pilot input controls or by remote control exteriorly of or interiorly to the aircraft in response to ground crew signals to activate the driver to rotate the drive wheel in a reverse, push back direction, causing the aircraft to move in the push back direction or in a forward direction for taxi and takeoff in accordance with activation of the controls.

12 Claims, 3 Drawing Sheets

(51) Int. Cl.
   *B64C 25/34*   (2006.01)
   *B64D 27/00*   (2006.01)

(56) References Cited

U.S. PATENT DOCUMENTS

| | | | |
|---|---|---|---|
| 6,657,334 B1 | 12/2003 | Edelson | |
| 6,838,791 B2 | 1/2005 | Edelson | |
| 6,928,363 B2 | 8/2005 | Sankrithi | |
| 6,935,479 B2 * | 8/2005 | Cummins | F16D 11/10 192/101 |
| 7,116,019 B2 | 10/2006 | Edelson | |
| 7,445,178 B2 | 11/2008 | McCoskey et al. | |
| 7,469,858 B2 | 12/2008 | Edelson | |
| 2008/0059053 A1 | 3/2008 | Cox et al. | |
| 2008/0103642 A1 * | 5/2008 | Cox | G08G 5/065 701/3 |
| 2008/0296429 A1 | 12/2008 | Edelson et al. | |
| 2009/0114765 A1 * | 5/2009 | Cox | B64C 25/40 244/50 |
| 2009/0218440 A1 | 9/2009 | Dilmaghani et al. | |
| 2009/0261197 A1 | 10/2009 | Cox et al. | |
| 2010/0217456 A1 * | 8/2010 | Edelson | B64F 1/22 701/2 |

* cited by examiner

METHOD AND SYSTEM FOR THE POWERED SELF PUSH BACK OF AN AIRCRAFT

PRIORITY

This application claims priority from Provisional Patent Application No. 60/440,652, filed Feb. 8, 2011 and Nonprovisional application Ser. No. 13/369,156 filed Feb. 8, 2012.

TECHNICAL FIELD

The present invention relates generally to a method and system for moving a parked aircraft on the ground and specifically to a method and system for employing a powered self push back system that independently moves an aircraft on the ground in reverse from a parked location in conjunction with constant cooperative communication between the aircraft pilot and ground crew without assistance from external vehicles or the aircraft's main engines.

BACKGROUND OF THE INVENTION

Most airports, especially large airports, currently simultaneously handle large numbers of arriving and departing aircraft of different sizes and body types. The successful management of a large volume of aircraft ground traffic requires careful control of all aircraft ground movement, particularly the movement of departing aircraft. Aircraft parked at a gate or docking area in an airport prior to departure are typically positioned with the nose of the aircraft facing the gate or docking structure, which may or may not be attached to the airport terminal. Upon departure, the aircraft must move in reverse and make one or more turns before reaching a taxiway prior to taxi and takeoff. Arriving aircraft are moving in a forward direction and turning as required to travel from the runway to a gate or docking structure as the departing aircraft are leaving. Departing aircraft must be maneuvered carefully in a reverse direction to avoid not only incoming aircraft traveling toward the gates, but also baggage carriers, tugs, and other airport ground vehicles on the trip between the gate and the taxiway. Reverse ground movement of an aircraft may also be required to move the aircraft into or out of a hangar or to a location for maintenance.

An aircraft can be moved in reverse from a parked position by starting the aircraft's main engines and reversing them to drive the aircraft in a reverse direction. This process, known as reverse thrust, is problematic and can be dangerous. An aircraft engine operating in reverse thrust pulls foreign object debris from the aircraft's environment into the engine and throws it forward, usually in the direction of the gate or airport terminal. The potential for injury to ground personnel, ground vehicles, and airport structures from foreign object debris (FOD) and from ground jet blast can be significant. In addition to the turbulence and noise created by an aircraft's engines in operation, moreover, the adverse impact on air quality and fuel costs must also be considered. It has been estimated that about 3200 pounds of fuel is used in an hour by an idling aircraft engine. An aircraft's engines idling between push back and takeoff, even if only about 20 minutes a day, can increase fuel costs by millions of dollars. The use of reverse thrust is prohibited at many airports, moreover. Dependence on the use of a departing aircraft's main engines is neither a safe nor a reliable push back procedure.

At the present, aircraft leaving a gate, docking structure, or simply a parked position near an airport terminal are typically assisted in their travel in a reverse direction by a special tow vehicle or tug that temporarily connects to the aircraft in the area of the forward nose wheel. Once attached to the aircraft, the tug pushes the aircraft in the reverse direction required to clear the gate to a location where the aircraft main engines can be turned on to move the aircraft in a forward direction. The tug is then detached from the aircraft and moved away, and the aircraft is ready to taxi to a runway for takeoff.

The movement of tugs and tow vehicles generally contributes to ground vehicle traffic. Tugs, in addition, must be monitored to keep track of their locations so they may be moved to the next location by the time a tug is needed to push back a departing aircraft. Many aircraft departure delays are the direct result of tug unavailability. Although pilot controlled and remotely controlled tugs are disclosed in the art, for example in U.S. Pat. No. 6,928,363 to Sankrithi and U.S. Pat. No. 6,305,484 to Leblanc, respectively, such tugs are not widely available, and a ground crew team is still required to monitor and move tugs and to carry out the push back process.

The ground crew must also ensure that no part of an aircraft structure will impact any fixed object or other aircraft or vehicle. The size of the ground crew assigned to push back functions depends on the size of the aircraft and usually includes at least three people: one to drive the tug or pushback vehicle, one to walk in the vicinity of one of the aircraft wing tips, and one to direct the push back maneuver and handle communications with the responsible aircraft cockpit crew member. Depending on the type of external tow vehicle or tug used for push back, additional ground personnel can be required to inactivate the aircraft steering, attach and remove the tow vehicle, and then reactivate the aircraft steering while communicating these actions to the flight crew. Ground crew must also return the tugs or tow vehicles from the location where they are detached from the aircraft to the gate area for reuse with another aircraft.

A variety of tow vehicles or tugs is known in the art, and all require careful operation to ensure safe push back of an aircraft. The aircraft push back process may use, for example, the type of widely known heavy tow vehicle that is attached to the nose wheel of an aircraft by a tow bar employing one or more kinds of pins to disable the aircraft nose wheel steering during pushback and/or to prevent the aircraft from being mishandled by the tug. A "towbarless" type of tug, such as that described in U.S. Pat. No. 5,480,271 to Franken et al, may also be used to achieve push back. Whichever type of tug is used, ground personnel are required to perform specific tasks to achieve safe and effective push back, including, among other tasks, inserting and removing pins, communicating the status of the pins to the cockpit crew, and ensuring that damage to the landing gear and injuries to the ground crew does not occur during tug engagement or push back. Each type of tug presents specific disadvantages. Specialized tow bars are typically required to tow different aircraft, and an airport must have a selection of specific types of tow bars ready to meet the needs of different aircraft. If the proper tow bar is not available, an aircraft cannot be connected to a tug and must wait for the correct tow bar, delaying push back and aircraft departure. Additionally, tug tractors are usually powered by gas or diesel engines, which negatively impacts airport ground noise and air quality with their emissions and increases airport facility fuel costs. Tugs without tow bars are often powered by electricity and offer improvements in maneuverability and control, but many require some type of adapter to enable the tug to move a particular type of aircraft. A similar size ground crew is needed for the operation of a tug with or without a tow bar, however, and tug movement and availability must still be monitored. Moreover, an airport operator is still required to maintain a fleet of tugs or tow vehicles and operators to push back departing aircraft and to otherwise move aircraft on the ground. With the cost of a single tug in excess of a quarter of a million dollars, this represents a substantial investment for an airport.

A further consideration raised by the present state of airport and aircraft pushback operations relates to the ground congestion found in most large airports. Multiple airlines conduct both push back and landing operations for multiple aircraft virtually simultaneously. This strains not only the available towing equipment, but also the available ground personnel. Aircraft turnaround times can be adversely affected when tow bars, adapters, tugs, or ground crews are not available when needed. Neither the airline nor the flight crew has any control over this situation. Moreover, if an aircraft is damaged during push back or causes damage to another aircraft during push back in a congested airport, and the damage is not detected prior to takeoff because ground crew were busy elsewhere, aircraft safety could be compromised.

The prior art, therefore, fails to provide a powered self push back method and system integral to an aircraft that can be controlled and operated by the aircraft pilot in cooperative communication with a minimal ground crew to effectively accomplish safe push back of the aircraft from a gate or docking structure independently without the use of external tow or tug vehicles or the aircraft main engines.

BRIEF DESCRIPTION OF THE INVENTION

It is a primary object of the present invention, therefore, to provide a powered self push back method and system integral to an aircraft that effectively accomplishes safe push back of the aircraft from a gate or docking structure independently without the use of external tow or tug vehicles that is fully controllable by the aircraft pilot in cooperative communication with a minimal ground crew staff for the push back operation.

It is another object of the present invention to provide an integral aircraft push back system for the independent power push back of an aircraft from a gate or docking structure that does not require use of the aircraft's main engines or reverse thrust and works in tandem with constant communication between the pilot and ground crew during push back.

It is an additional object of the present invention to provide controls for an aircraft powered self push back system that supplement and interact with an aircraft's existing controls that may be operated and controlled by the aircraft pilot from the cockpit in response to constant cooperative communication from the ground crew.

It is a further object of the present invention to provide an aircraft powered self push back system that may be controlled remotely from a selected location interior to the aircraft or from a remote location exterior to the aircraft that enables the cooperative communication between ground crew and flight crew to accomplish a safe push back.

It is yet another object of the present invention to provide an aircraft powered self push back system that may be readily integrally incorporated into any existing aircraft.

It is yet a further object of the present invention to provide an aircraft powered self push back method and system that safely, effectively, and efficiently moves a departing aircraft in reverse away from a gate or docking structure while maximizing fuel savings and minimizing adverse effects on air quality.

It is yet an additional object of the present invention to provide an aircraft powered self push back method and system that may be operated with minimal ground crew in cooperative communication with the aircraft pilot and flight crew while decreasing the risk of damage to the aircraft and to other aircraft or nearby structures during push back.

It is a still further object of the present invention to provide an aircraft powered self push back control method and system that shortens the time required for push back and, therefore, shortens aircraft turnaround times.

In accordance with the aforesaid objects, the present invention overcomes the deficiencies of the prior art and provides a powered self push back method and system for an aircraft that may be controlled by the flight crew from the cockpit in cooperative communication with a minimal ground crew staff or may be controlled remotely from a selected location interior to or exterior of the aircraft to move the aircraft on the ground in reverse and otherwise as required for push back without assistance from an external tow vehicle or the aircraft engines. The present powered self push back system includes at least one self-propelled aircraft wheel drive assembly powered by a driver to rotate in a drive wheel in a selected direction in response to pilot controls operatively connected with a source of power and the powered self-propelled drive wheel assembly and driver to control rotation of the driver and the drive wheel, causing the aircraft to move in the selected direction of rotation in accordance with actuation of the controls. Additional controls for operating the powered self push back system may include a ground movement control apparatus exterior to the aircraft operable from the ground to direct and control the push back method and process, and a remote ground movement control apparatus that may be used from a selected location interiorly or exteriorly of the aircraft pursuant to cooperative communication between the flight crew and a minimal ground crew staff to actuate and direct the driver assembly to control the push back process. Existing cockpit controls for the operation of the aircraft nose wheel steering and brakes may be adapted as required to interface with the powered self push back drive wheel assembly and controls. The powered self push back method employs the aforementioned powered self push back system in conjunction with constant signaling communication between an aircraft flight crew and the ground crew assigned to oversee push back of the aircraft.

Other objects and advantages will be apparent from the following description, drawings, and claims.

DETAILED DESCRIPTION OF THE INVENTION

The powered self push back method and system for an aircraft of the present invention provides significant advantages and efficiencies for airport operation. No tugs, tow bars, or tug adaptors are required, and an airline or airport will no longer need to keep this equipment available for aircraft equipped with the present powered self push back system in their inventory of ground vehicles and equipment, which will reduce both airport equipment costs and ground vehicle congestion. Aircraft will not be required to wait for a tug or a specific tow bar or tug adapter for push back or any other airport ground movement currently accomplished by tugs, which will significantly reduce aircraft turnaround times. The time of push back will be predictable. A smaller number of ground crew personnel will be needed to communicate with the flight crew and to oversee push back and other aircraft ground movement, freeing ground personnel for other tasks. Fuel savings will be realized for both airport operators, who no longer need to supply fuel for tugs and for airlines, who can reduce the amount of time aircraft main engines must run. Additionally, the resulting elimination of foreign object debris and noise reduction will increase airport ground safety. Aircraft pilots and cockpit crew, through constant cooperative communication, will have the ability to control the entire push back process, which can also be controlled from the ground or remotely from a selected location interior or exterior of the aircraft. The present invention eliminates all of the reasons why self push back should not be done.

Figure 1A:
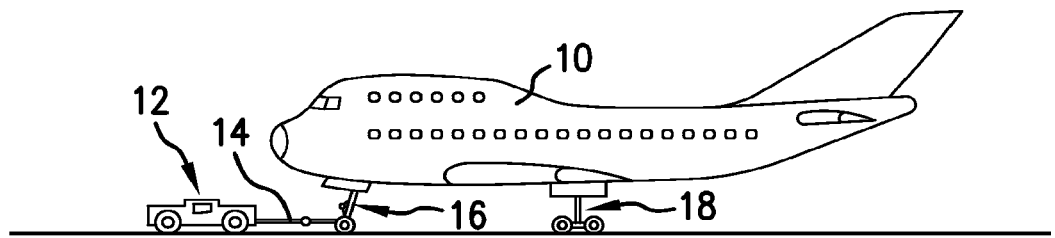
FIG. 1a illustrates a prior art push back process in side view with an aircraft being moved by a push back tug.

FIG. 1a illustrates an aircraft 10 with a prior art push back arrangement using a tow vehicle or tug 12 of the type requiring a tow bar 14 to attach the tug 12 to the aircraft 10. In this particular arrangement, the tow bar 14 is attached to the aircraft nose wheel landing gear assembly 16. This type of tug attachment requires the aircraft nose wheel steering to be disabled so the tug can safely move the aircraft in reverse away from the gate without interference from the steering. A main landing gear of the aircraft is shown at 18.

The powered self push back system of the present invention does not require a tug as shown in FIG. 1a, but is based on a unique aircraft ground movement control system with a wheel drive assembly 20 (FIG. 2) that is activatable to power ground movement of the aircraft only when the aircraft is moving on the ground and is deactivated when the aircraft is in flight. To achieve this, the preferred aircraft ground movement control system includes control and other components in a failsafe system with multiple redundancies (not shown) to ensure deactivation of the system when conditions indicate that its operation should not be continued.

Figure 1B:
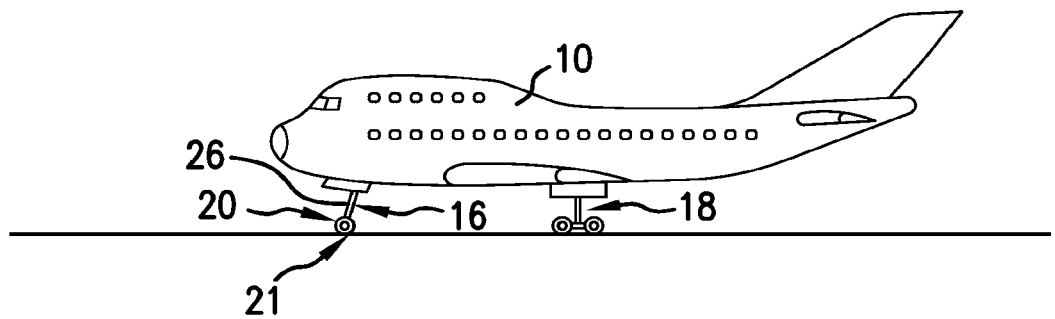
FIG. 1b illustrates, in side view, an aircraft without the tug of FIG. 1a equipped with a powered self push back system according to the present invention and ready for push back.
Figure 2:
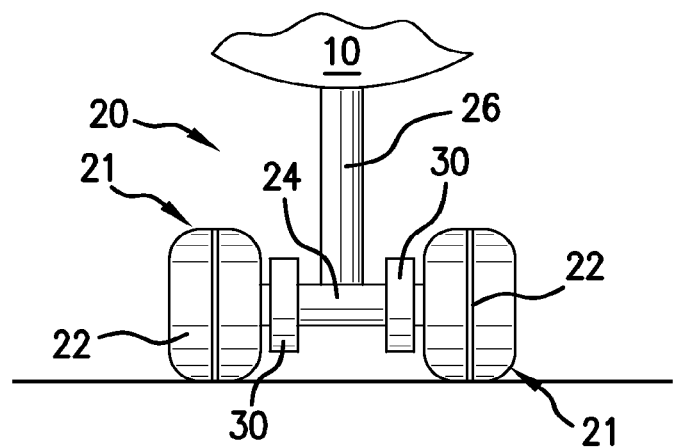
FIG. 2 is a diagrammatic illustration of one embodiment of a powered self push back wheel driver assembly mounted in connection with an aircraft drive wheel in accordance with the present invention.

The powered self push back method and system of the present invention are particularly useful in an aircraft of the type that has at least one powered self-propelled nose gear or main gear drive wheel assembly 20, such as shown in FIG. 2. FIG. 1b shows the aircraft of FIG. 1a with a drive wheel assembly of the powered self push back system installed on the nose landing gear 16, although it could also be installed on a main landing gear 18. FIG. 2 illustrates, diagrammatically, a front view of one possible arrangement of wheel drive assembly 20 components of the powered self push back system of the present invention mounted in connection with a pair of aircraft drive wheels 21, corresponding to the single wheel 21 shown in side view in FIG. 1b. The embodiment of FIG. 2 shows one preferred relative location of wheel drive assembly 20 components. Two wheels 21 with tires 22 are shown rotatably mounted at opposite ends of an axle 24. The axle 24 is mounted on a strut 26 that is connected to the aircraft 10. FIG. 2 shows two drivers 30 mounted adjacent to each wheel 21 in driving communication with the wheels and axle 24. The powered self push back system of the present invention does not require two wheel drivers 30 to function effectively during push back. A single wheel driver 30 can power the self push back process described herein. The driver or drivers 30, moreover, may be positioned interiorly of the wheels 21 on the axle 24 as shown in FIG. 2 or exteriorly of the wheels on the axle 24 (not shown). Other numbers of drivers and variations in driver positions or locations are also contemplated to be within the scope of the present invention. Such positions and locations could include, for example without limitation, within a nose wheel or main wheel, within a nose wheel or main wheel landing gear space, or in any other convenient onboard location inside or outside the wheel.

Powered self push back of an aircraft by the preferred aircraft ground movement control system of the present invention is achieved by one or more wheel drivers 30 mounted in driving relationship with the aircraft nose wheel or another aircraft drive wheel to move the nose or other drive wheel at a desired speed and torque. A driver preferred for this purpose is a high phase order electric motor of the type described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of motor capable of driving an aircraft on the ground, including but not limited to electric induction motors, permanent magnet brushless DC motors, switched reluctance motors, hydraulic pump/motor assemblies, and pneumatic motors may also be used as the driver 30 in the wheel driver assembly 20. Other motor designs, whether electric, hydraulic, or the like, capable of high torque operation across the speed range that can be integrated into an aircraft nose wheel or other wheel to function as described herein may also be suitable for use in the aircraft powered self push back system of the present invention.

An example of one type of high phase order electric motor preferred for use as a driver in the aircraft powered self push back method and system of the present invention has a top tangential speed of 15,000 linear feet per minute and a maximum rotor speed of 7200 rpm, or about 28 miles per hour with a preferred gear ratio and a 27 inch effective wheel diameter. This example is not intended to be limiting, and other drivers capable of performing the described required push back functions are intended to be within the scope of the present invention.

The supply of power to the wheel drive assembly 20 and driver 30 of the powered self push back system of the present invention is preferably achieved by the interconnection of and interaction between the aircraft APU and other aircraft power sources and associated power distribution system components connected to the wheel drive assembly 20 and cockpit and other controls (not shown) for the wheel drive assembly 20. Appropriate connectors, such as one or more wire harnesses (not shown) may be provided to electrically connect the wheel drive assembly 20 to the aircraft auxiliary power unit or other aircraft electrical power source. The aircraft auxiliary power unit (APU) is the preferred main source of AC and DC power for the present powered self push back system and should be configured to handle the loads required for push back. The power provided to the wheel drive assembly 20 and a preferred driver 30 is preferably high phase order output for optimal function of the system. A preferred high phase order electric motor requires phase modules arranged in series to provide the high phase order output needed by each wheel driver 30 when more than one wheel drive assembly and driver are used.

Control components for the powered self push back system can be easily added to an aircraft's existing standard cockpit controls. The pilot or other designated flight crew member can fully control steering and braking of the aircraft during operation of the powered self push back system of the present invention using existing controls.

The reverse movement of the aircraft required for push back is achieved when the pilot uses the appropriate cockpit controls to activate the aircraft drive wheel assembly 20 to move the driver 30 in a reverse direction. The activated wheel driver 30 is powered by the aircraft APU or another aircraft electrical or other power source to rotate the drive wheel on which it is mounted in a reverse direction, causing the aircraft to move independently in a reverse direction away from its gate or parking area as required for push back. When the aircraft has cleared the gate or other parking area, the pilot will typically apply the aircraft brakes, which sends a signal to the driver 30 to stop moving the wheel in reverse. The pilot then uses the appropriate cockpit controls to activate the driver to move in a forward direction, causing the driven wheel to rotate in a forward direction. The power supplied to the drive wheel driver 30 will move the aircraft in a forward direction to a designated runway for takeoff. The drive wheel driver 30 is designed to receive a power supply sufficient to power the aircraft drive wheel at runway speeds. Consequently, the aircraft main engines are not required to power the aircraft's movement during taxi until a relatively short time before takeoff. When the aircraft main engines are turned on, the wheel drive assembly 20 will be positively inactivated, either by the operation of a selected cockpit control or automatically in the event the cockpit control is not operated to inactivate the wheel drive assembly or driver 30. The wheel drive assembly 20 and driver 30 should remain inactivated during flight.

Figure 3:
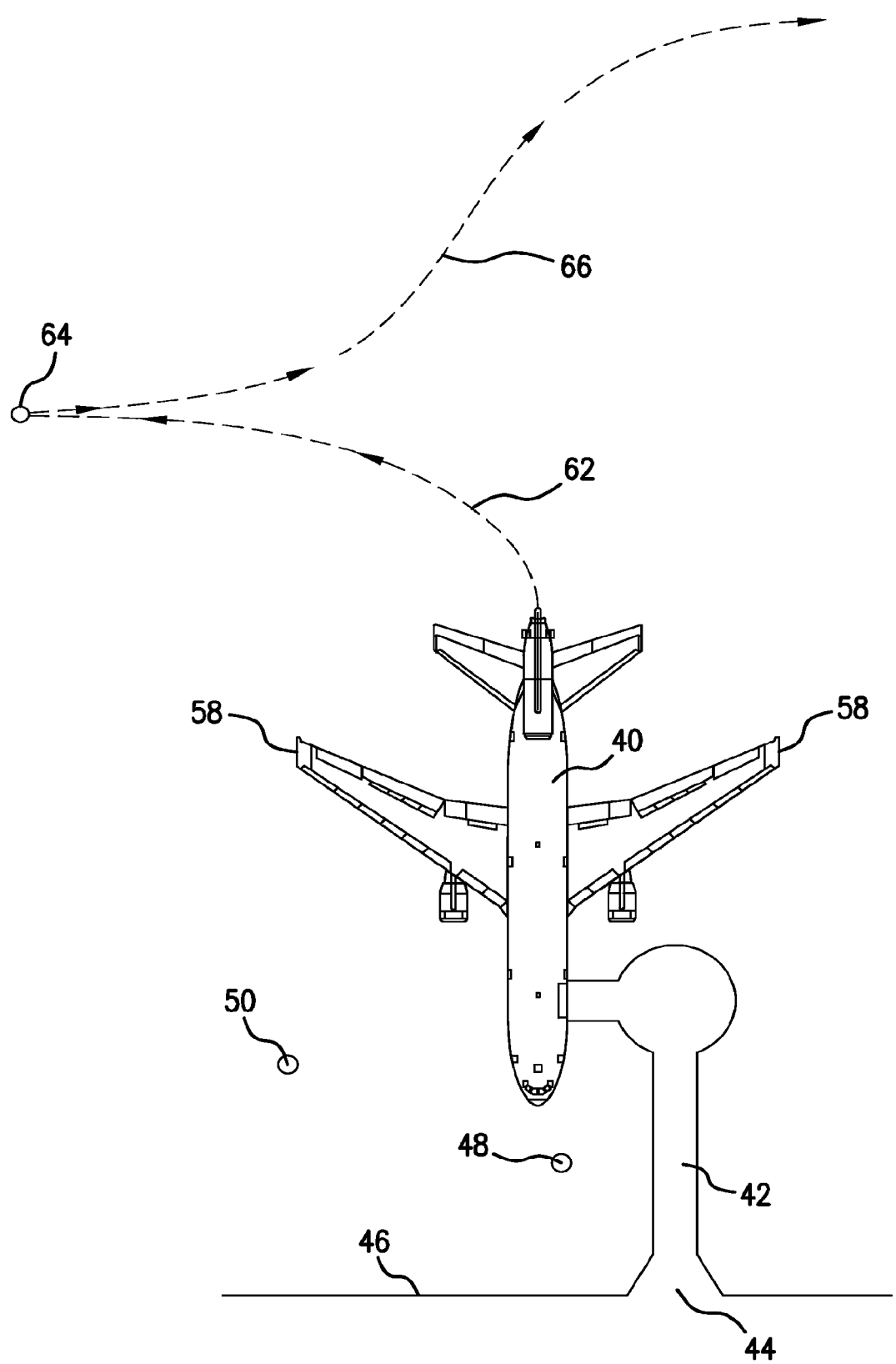
FIG. 3 is a top view of an aircraft equipped with a powered self push back system according to the present invention parked at an airport gate showing a push back path to be followed by the aircraft during powered self push back according to the present invention.
Figure 4:
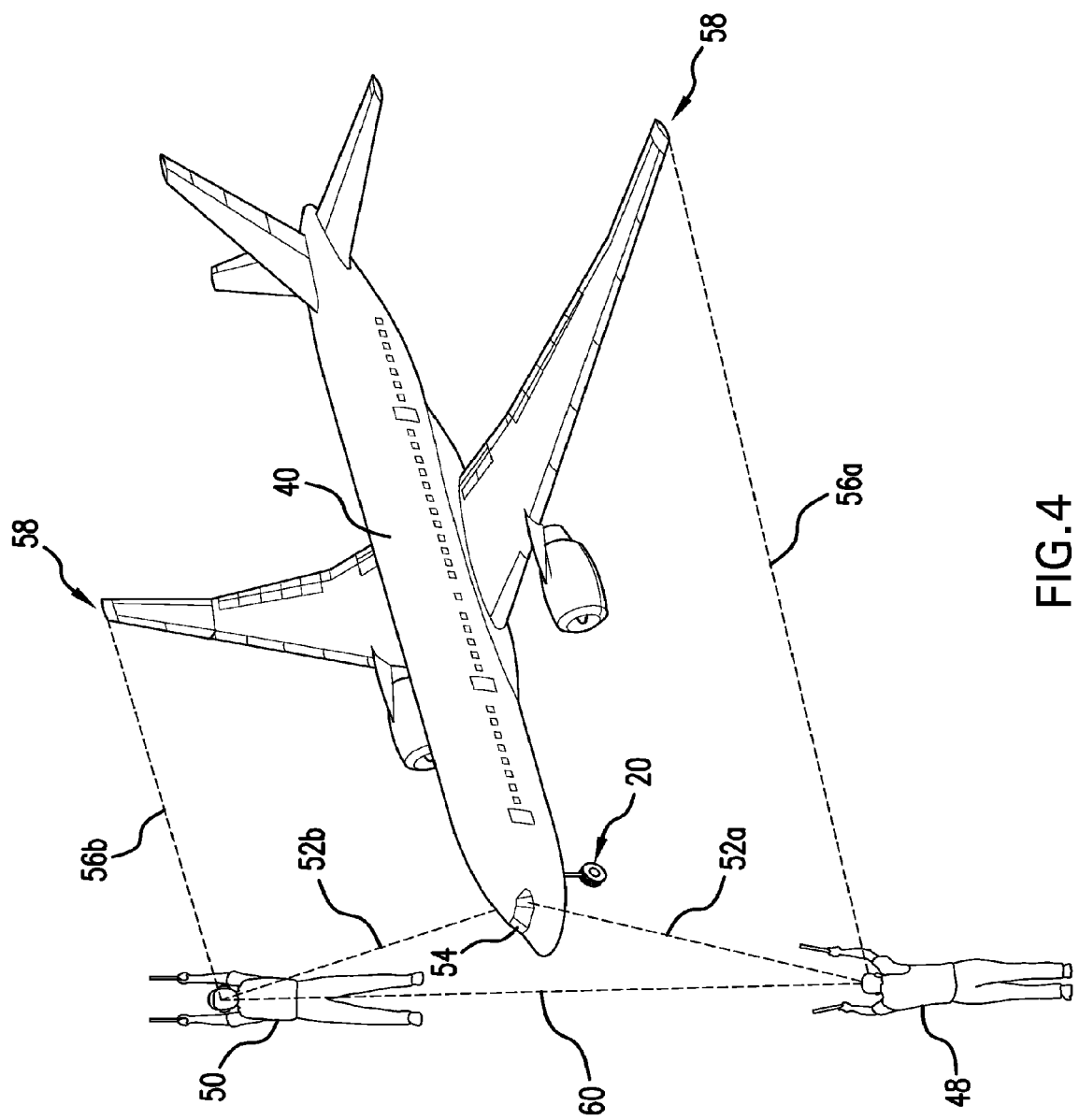
FIG. 4 illustrates the positions of ground crew relative to an aircraft equipped with the powered self push back system of the present invention during the push back process.

FIGS. 3 and 4 illustrate the powered self push back method of the present invention. An aircraft 40 equipped with the powered self push back system of the present invention is shown parked at an air bridge 42 that is connected to a gate 44 at an airport terminal 46 in FIG. 3. When the aircraft 40 is ready for departure, and the flight crew has received clearance from air traffic control, the air bridge 42 will be moved away from the aircraft. Upon completion of aircraft dispatch and disconnection of the air bridge or gate, the aircraft pilot will advise the ground crew ramp personnel that the aircraft is "ready for push." Up to this point, the push back process is similar to a prior art push back process. A significant difference, however, is that the ground crew does not have to include personnel to install a nose wheel steering bypass pin, ensure that hydraulic pumps are off, or perform any of the actions required to attach a tug or tow vehicle and its related equipment. All that the ground crew has to do is clear the area around the aircraft's push back path, ensure that the area remains clear, and continue to communicate that information to the pilot and flight crew during travel of the aircraft in the push back direction.

Communication between the ground crew and the pilot may be by hand signals, in which case clearance of the area is indicated by a "thumbs up" signal. If the area for push back is not clear, an appropriate hand or other signal will be provided to the pilot by the ground crew charged with ensuring that the area is clear. Standard hand and arm signals for airport operations on the ground are well known and can be found in the Federal Aviation Administration (FAA) publication FAR/AIM (Aeronautical Information Manual) and in the publications of corresponding international aviation organizations. Communication between the pilot and ground crew may also be by voice using standard interphone or other radio communications, or by any other suitable communication devices, including, but not limited to, those described in commonly owned U.S. Patent Publication No. US2008/0059053, the disclosure of which is incorporated herein by reference.

When the flight crew is ready to begin the push back process, the pilot or other flight crew member will give the specific airline's hand or arm signals or otherwise communicate that the aircraft brakes have been released and that the aircraft has been cleared for push back. To signal visually to the ground crew that the aircraft brakes are off and that push back clearance has been received, the pilot will raise both hands formed as fists and simultaneously open both hands so that the open hands are facing a ground crew member responsible for receiving pilot signals to indicate "brakes released." The pilot will then face both hands toward each other and move the hands in a rocking motion backwards, which signals the ground crew that the aircraft is "cleared to push." This also means that push back operations are being immediately commenced by the flight crew. The pilot will activate one or more of the aircraft powered self-propelled nose wheel or main wheel drive assemblies 20, causing the driven wheel or wheels to rotate in reverse, which moves the aircraft in reverse and away from the airport terminal 46 along the path shown in FIG. 3.

At least two ground crew operators, represented at 48 and 50 in FIGS. 3 and 4, will then walk away from the terminal with the aircraft 40 as it is powered to move in reverse by the one or more self-propelled drive wheel assembly drivers 30. The ground crew operators 48 and 50 are preferably positioned relative to the aircraft as shown in FIG. 4 so that their lines of sight are as indicated by the dashed lines. Dashed lines 52a and 52b represent the lines of sight between each ground crew staff member 48 and 50, respectively, and the aircraft cockpit 54, specifically the pilot (not shown). Dashed lines 56a and 56b represent the lines of sight between each ground crew operator 48, 50, respectively, and the tips 58 of the aircraft wings. Dashed line 60 represents the line of sight between ground crew operator 48 and ground crew operator 60. As the ground crew operators 48 and 50 walk with the aircraft 40 while it is traveling in reverse during push back, they maintain visual contact with the pilot, such as along sight lines 52a and 52b, as the pilot controls the aircraft. Signals are constantly relayed by the ground crew operators to the pilot to guide the pilot and flight crew while the push back process is being conducted. These signals may be relayed using the FAA standard hand signals for ground crew or by any other method of relaying signals, such as, for example, standard interphone, radio, or any other appropriate communication method or apparatus.

As push back is initiated, the pilot will activate the one or more wheel drive assemblies 20 mounted on one or more of the aircraft drive wheels so that the driver or drivers 30 are capable of driving the aircraft drive wheel or wheels in the reverse push back direction. The pilot or other flight crew member will operate a designated cockpit control (not shown) to signal the wheel drive assembly driver 30 to rotate in a reverse direction relative to the nose of the aircraft, causing the aircraft drive wheel to rotate in a reverse direction, moving the aircraft in reverse along the path 62 (FIG. 3) away from the terminal 46. When the aircraft has moved in reverse a sufficient distance to clear the air bridge 42 and any other structures or aircraft, ground crew operators 48 and 50 will communicate this to the pilot, as described above, who will then apply the aircraft brakes to stop the aircraft reverse movement, such as at location 64 in FIG. 3, for example. In response to signals from the ground crew operators 48 and 50 indicating that the area is clear, the pilot can give the ground crew operators a "ready to taxi" signal, indicating that the aircraft is ready to taxi. The wheel drive assembly 20 controls are then activated to power the driver or drivers 30 and rotate the aircraft drive wheel in a forward direction toward the aircraft nose, causing the driver or drivers and the drive wheel to rotate in a forward direction, moving the aircraft along the path 66 (FIG. 3) in a forward direction to a taxiway and runway for takeoff.

If the ground crew operator's signal to the pilot indicates that the proposed path 66 is not clear, the pilot can remain at location 64 until signaled that it is safe to proceed. None of these maneuvers require operation of the aircraft main engines, which can remain off until an appropriate interval prior to takeoff. At this point, the ground crew operators 48 and 50 can simply return to the gate area. There will be no bypass pin or other apparatus to remove from the aircraft and no tug or tow vehicle to disconnect from the aircraft nose gear and move either to the next aircraft to be pushed back or to the gate area. The powered push back method and system of the present invention can significantly reduce ground vehicle traffic by eliminating the need for tugs or tow vehicles.

The aircraft powered self push back method and system of the present invention can be activated and controlled internally by the flight crew from the aircraft cockpit as described above using existing and easily added supplemental controls or externally from outside the aircraft by ground personnel to achieve powered self push back of the aircraft from a parked position independently without operation of the aircraft's main engines or external mechanical assistance from a tug as shown in FIG. 1a. At least one designated ground crew operator works from the gate or other docking area in communication with the aircraft cockpit crew to guide the powered push back process illustrated in FIG. 3 as needed. A preferred remote control apparatus will enable the ground crew operator to override the pilot's control actions as appropriate or in emergency situations. The ground crew operator may use a remote control apparatus (not shown), which may be a handheld device designed to access and activate designated powered self push back system cockpit controls, such as switches to activate and deactivate the wheel drive assembly 20 and a forward and reverse switch to control the direction of rotation of the driver 30. Control of the aircraft steering and brakes may also be set up to be controlled remotely, if desired. Preferably, at least one ground crew operator should be able to access remotely the controls needed to assist the pilot with powered self push back as required. A single ground crew operator can efficiently conduct push back operations for a number of aircraft in a shorter time than is required to attach a tug and move each aircraft away from the gate. Even if additional ground crew operators are employed beyond the two ground crew operators 48 and 50 shown in FIGS. 3 and 4, a smaller ground crew is required to accomplish push back operations with the powered push back system of the present invention than are required for push back maneuvers using an external tug or tow vehicle.

During remote operation of the present powered push back system, contact with the pilot of an aircraft scheduled to depart is made by the ground crew operator, the appropriate powered self push back system cockpit controls are activated remotely by the ground operator and/or within the cockpit by the pilot, and the wheel drive assembly 20 is fully powered, engaged, and able to push the aircraft back from the gate and independently move the aircraft onto the runway for taxiing and takeoff. Ground crew operators will still be required to ensure that the area around the aircraft is clear during a remote push back procedure. These additional ground crew operators will be in communication with both the ground crew operator in charge of the remotely controlled push back operation and with the pilot to monitor the proximity of the aircraft in push back to other aircraft and airport structures and ensure a safe push back operation. The ground crew operator conducting the remotely controlled push back and the assisting ground crew operators are then free to move to the next aircraft in position for push back and begin the process again.

A remote control apparatus suitable for use by a ground crew operator to assist a pilot with powered self push back should be able to establish a highly secure, preferably wireless, communication channel with the cockpit crew and the aircraft cockpit controls that activate the aircraft's powered wheel drive assembly and driver as described above. Handheld and other remote access devices that use secure communications channels are known and can be adapted for use to control remotely the aircraft push back process as described herein. It is contemplated that these remote access devices may be used as needed in combination with ground crew operator standard hand and arm signals to ensure a safe powered push back operation.

The remote control apparatus for controlling or assisting the pilot in controlling powered self push back of an aircraft as described herein can be distributed to specifically designated ground crew operators assigned to push back operations, can be maintained in another remote location exterior to the aircraft, or can be maintained in a location in an interior area of the aircraft other than the cockpit or flight deck.

While the present invention has been described with respect to preferred embodiments, this is not intended to be limiting, and other arrangements and structures that perform the required functions are contemplated to be within the scope of the present invention.

INDUSTRIAL APPLICABILITY

The powered self push back method and system of the present invention will find its primary use in new and existing aircraft when it is desired to achieve safe, efficient, and effective independent push back and other ground movement of the aircraft without using tow vehicles or the aircraft main engines, to reduce aircraft and airport fuel costs, and to improve airport ground traffic control.

The invention claimed is:

1. A method for the independent powered self push back of an aircraft comprising:
    a. equipping an aircraft with at least one self-propelled drive wheel powered by drive means mounted to drive said at least one wheel and powered to drive the drive wheel to rotate in a selected forward or reverse direction, thereby driving the aircraft in said selected direction, brakes, pilot input control means, and remote control means located either or both of interiorly or exteriorly of said aircraft and operatively connected to said drive means;
    b. commencing communication between a pilot of said equipped aircraft and ground crew upon completion of aircraft dispatch and gate disconnect, wherein the pilot signals to the ground crew that the aircraft is ready to begin push back;
    c. clearing the area for push back by the ground crew in response to the pilot signal that the aircraft is ready for push back, wherein the ground crew communicates to the pilot that the push back area is clear;
    d. releasing the aircraft brakes, actuating the pilot input control means to power said drive means to rotate said at least one drive wheel in a reverse direction, thereby causing the aircraft to move in a reverse, push back direction, wherein the pilot communicates to the ground crew that the aircraft brakes have been released and push back operations have been started;

e. operating the drive means to move the aircraft in reverse while one or more ground crew walk on the ground with the aircraft while said aircraft travels in a reverse push back direction, wherein said ground crew are positioned to constantly maintain visual contact with the pilot and relay signals to the pilot to guide the pilot to move the aircraft safely in the push back direction;

f. when the aircraft has been guided by communication between the pilot and the ground crew in the push back direction to reach a location where the aircraft must change to a direction different from the push back direction, applying the aircraft brakes to stop rotation of the powered self-propelled wheel; and g. after receiving an all clear signal from the ground crew, actuating said pilot input control means to power the drive means to rotate the wheel in a forward direction, causing the aircraft to move in a forward direction for taxi and takeoff.

2. The method of claim 1, further comprising alternatively, first activating said remote control means instead of the pilot input control means to power the drive means and independently drive the aircraft in reverse to commence and carry out the push back operation and then activating the remote control means to power the drive means and independently drive the aircraft in a forward direction to move to a runway for takeoff.

3. The method of claim 2, wherein said remote control means is located exteriorly of the aircraft and is operable by designated ground crew or located interiorly in the aircraft other than in the cockpit and is operable by flight personnel other than the pilot or cockpit crew.

4. The method described in claim 2, further comprising operating the remote control means to override the pilot input control means by ground crew or by flight personnel other than the pilot or cockpit crew in an appropriate situation to stop the powered self push back of the aircraft.

5. The method of claim 1, further comprising positioning the ground crew in locations relative to the aircraft's exterior identified to provide an optimum view of the aircraft's wing tips and surroundings during push back and optimum visual contact with the aircraft pilot and to provide constant cooperative communication with the aircraft pilot during powered self push back.

6. The method of claim 1, wherein said at least one self-propelled drive wheel comprises at least one nose landing gear wheel.

7. The method of claim 1, wherein said at least one self-propelled drive wheel comprises at least one main landing gear wheel.

8. The method of claim 1, wherein said drive means comprises a motor selected from the group comprising electric induction motors, permanent magnet brushless DC motors, switched reluctance motors, hydraulic pump/motor assemblies, and pneumatic motors.

9. The method of claim 1, wherein said drive means comprises an electric motor drivingly connected between said at least one self-propelled drive wheel and said pilot input control means.

10. The method claim 9, wherein said electric motor is selected from the group comprising electric induction motors, permanent magnet brushless DC motors, and switched reluctance motors.

11. The method claim 9, wherein two of said drive means are each mounted to drive each of two nose landing gear wheels or each of two main landing gear wheels.

12. The method claim 1, further comprising providing signal means for enabling constant cooperative communication between the pilot and the ground crew, wherein said signal means comprises auditory signals, hand signals, and visual signals.

* * * * *